(12) United States Patent
Robert et al.

(10) Patent No.: US 10,109,829 B2
(45) Date of Patent: Oct. 23, 2018

(54) SUPPORT ASSEMBLY FOR TRACTION BATTERY

(71) Applicant: Ford Global Technologies, LLC, Dearborn, MI (US)

(72) Inventors: Brian Joseph Robert, St. Clair Shores, MI (US); Renata Michaela Arsenault, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 14/933,387

(22) Filed: Nov. 5, 2015

(65) Prior Publication Data
US 2017/0133644 A1 May 11, 2017

(51) Int. Cl.
| | | |
|---|---|---|
| H01M 2/10 | (2006.01) |
| H01M 10/647 | (2014.01) |
| H01M 10/613 | (2014.01) |
| H01M 10/625 | (2014.01) |
| H01M 10/6557 | (2014.01) |
| H01M 10/6551 | (2014.01) |
| H01M 10/6554 | (2014.01) |
| H01M 10/658 | (2014.01) |

(52) U.S. Cl.
CPC ....... H01M 2/1077 (2013.01); H01M 10/613 (2015.04); H01M 10/625 (2015.04); H01M 10/647 (2015.04); H01M 10/658 (2015.04); H01M 10/6551 (2015.04); H01M 10/6554 (2015.04); H01M 10/6557 (2015.04); *H01M 2220/20* (2013.01)

(58) Field of Classification Search
CPC ............ H01M 10/613; H01M 10/625; H01M 10/647; H01M 10/6551; H01M 10/6557; H01M 2/1077
See application file for complete search history.

(56) References Cited

U.S. PATENT DOCUMENTS

| | | | |
|---|---|---|---|
| 6,455,190 B1 | 9/2002 | Inoue et al. |
| 6,858,344 B2 | 2/2005 | Marukawa et al. |
| 7,332,244 B2 | 2/2008 | Uemoto et al. |
| 8,124,270 B2 | 2/2012 | Asahina et al. |
| 8,298,700 B2 | 10/2012 | Asahina et al. |

(Continued)

FOREIGN PATENT DOCUMENTS

| | | |
|---|---|---|
| DE | 102011080974 A1 | 2/2013 |
| JP | S6337574 A | 2/1988 |

(Continued)

*Primary Examiner* — Osei K Amponsah
(74) *Attorney, Agent, or Firm* — James Dottavio; Brooks Kushman P.C.

(57) ABSTRACT

A vehicle traction battery assembly including an array of stacked prismatic can cases and a support structure is provided. Each of the can cases may define a cavity to receive a battery cell and a multi-prong comb-shaped base. The support structure supports the cases. The support structure and the base define channels therebetween configured for coolant to pass therethrough. A lower portion of each of the can cases open to the channels may be of a dielectric material. A dielectric layer may span a length of the can cases and may be located above the channels. Each of the can cases may define a first locating feature sized to integrate with a second locating feature of an adjacent can case to align the can cases.

18 Claims, 6 Drawing Sheets

(56) References Cited

U.S. PATENT DOCUMENTS

| | | |
|---|---|---|
| 8,524,387 B2 | 9/2013 | Graaf et al. |
| 8,703,316 B2 | 4/2014 | Motohashi |
| 2005/0255379 A1* | 11/2005 | Marchio ............ H01M 2/0242 429/153 |
| 2008/0299448 A1* | 12/2008 | Buck ................ H01M 10/6553 429/120 |
| 2010/0104935 A1 | 4/2010 | Hermann et al. |
| 2012/0009455 A1* | 1/2012 | Yoon ................ H01M 10/6552 429/120 |
| 2014/0349162 A1 | 11/2014 | Koumvakalis et al. |
| 2014/0363719 A1 | 12/2014 | Kwak et al. |

FOREIGN PATENT DOCUMENTS

| | | | | |
|---|---|---|---|---|
| JP | 2012-119158 | * | 6/2012 | ............ H01M 10/50 2/10 |
| JP | 2014-089822 | * | 5/2014 | ............. H01M 2/10 |
| KR | 101370144 B1 | | 3/2014 | |

* cited by examiner

SUPPORT ASSEMBLY FOR TRACTION BATTERY

TECHNICAL FIELD

This disclosure relates to thermal management systems for high voltage batteries utilized in vehicles.

BACKGROUND

Electrified vehicles, such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A vehicle traction battery assembly includes an array of stacked prismatic can cases and a support structure. Each of the can cases defines a cavity to receive a battery cell and a multi-prong comb-shaped base. The support structure supports the cases. The support structure and the base define channels therebetween configured for coolant to pass therethrough. A lower portion of each of the can cases open to the channels may be of a dielectric material. A dielectric layer may span a length of the can cases and may be located above the channels. Each of the can cases may define a first locating feature sized to integrate with a second locating feature of an adjacent can case to align the can cases. Each of the bases may define a first locating feature configured to integrate with a second locating feature of the tray to align the can cases. A gasket may seal the channels. The assembly may lack a thermal interface material.

A vehicle traction battery assembly includes a housing and a thermal base. The housing defines a cavity sized to receive a prismatic battery cell. The thermal base defines a width equal to a width of the housing and defines one or more fins spaced apart from one another along a length of the thermal base. The fins of the thermal base are configured to align with fins of another thermal base to define coolant channels when two or more thermal bases are stacked in an array. The thermal base may further define a mechanical fastener configured to secure a support structure thereto such that the fins of the thermal base are aligned with the fins of the another thermal base when stacked in an array. A gasket may be secured between the support structure and a perimeter of the stacked thermal bases such that coolant is contained within the channels. The thermal base may further define a locating feature extending vertically along a side thereof configured for mating with a complementary receiving channel defined on the support structure. The thermal base may include a dielectric layer located below a metal bond interface layer joined with the housing. The fins of the thermal base may be of a dielectric material and an upper portion of the thermal base defines a metal bond interface. The thermal base may define a metal bond interface.

A modular vehicle traction battery assembly includes a plurality of prismatic battery cells, a plurality of thermal bases, and a tray. The plurality of thermal bases each define a cavity sized to receive one of the battery cells and a first locating feature, and each includes a fin extending from a lower portion. The tray is arranged with the thermal bases to define two coolant channels on either side of each of the fins when the thermal bases are aligned. The tray defines a plurality of second locating features each sized to mate with the first locating features. Each of the thermal bases is sized to mate with any one of the second locating features to mount the thermal bases to the tray. Each of the thermal bases may include a dielectric layer located between the cavity and coolant channels. A lower portion of each of the thermal bases open to the channels may be of a dielectric material. A lower portion of each of the thermal bases may define a metal bond interface. A gasket may be secured between the prismatic battery cells and the tray such that coolant is contained within the channels. The assembly may lack a thermal interface material.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
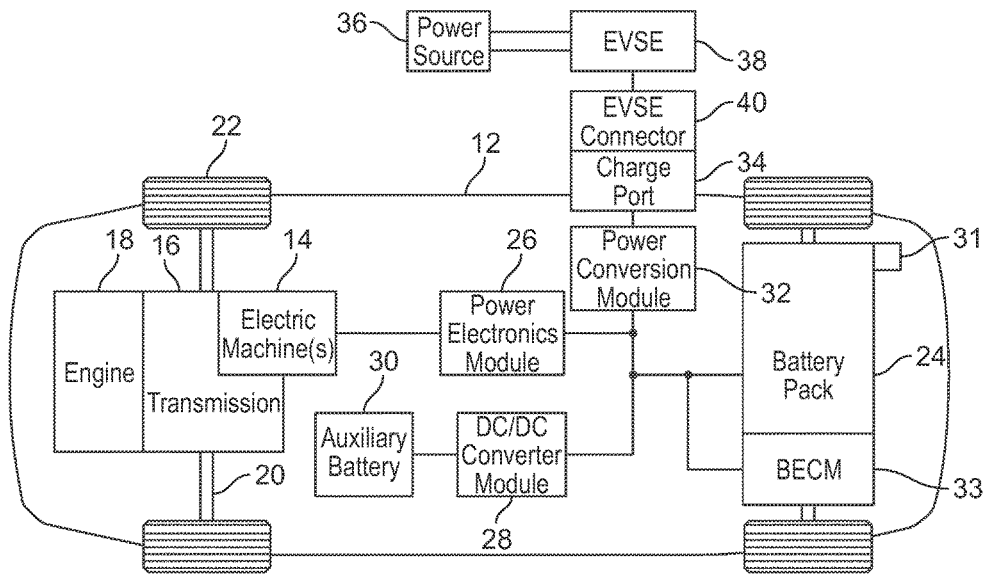
FIG. 1 is a schematic illustrating an example of a battery electric vehicle.

FIG. 1 depicts a schematic of an example of a plug-in hybrid-electric vehicle (PHEV), referred to as a vehicle 12 herein. The vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may also be electrically connected to the electric machines 14 and provides the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter module 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter module 28. The low-voltage systems may be electrically connected to an auxiliary battery 30 (e.g., 12V battery).

A battery electrical control module (BECM) 33 may be in communication with the fraction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV. The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

Battery cells, such as prismatic cells, may include electrochemical cells that convert stored chemical energy to electrical energy. Prismatic cells may include a housing, a positive electrode (cathode) and a negative electrode (anode). The housing is sometimes referred to as a can or a can case. An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. Battery cells and components of traction batteries may be heated and/or cooled using a liquid thermal management system, an air thermal management system, or other method as known in the art.

Contact of the mating surfaces between a thermal plate and surfaces of battery cells is a factor which may affect heat transfer within a battery thermal management system and particularly with regard to conduction between the thermal plate and the battery cells. The mating surfaces may be uneven due to surface tolerances, component irregularities, and/or debris which may result in gaps therebetween.

Figure 2:
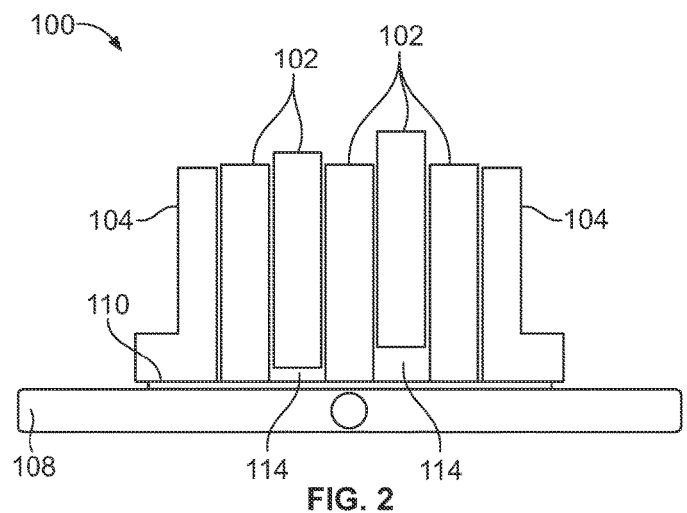
FIG. 2 is front view of a portion of a traction battery and thermal management system showing an example of battery cell contact issues.

FIG. 2 shows an example of a portion of a traction battery assembly, generally referred to as a traction battery assembly 100. The traction battery assembly 100 may include battery cells 102 stacked in an array, a pair of endplates 104 retaining the battery cells 102 therebetween, a thermal plate 108, and a thermal interface layer 110. In this example, regions 114 illustrate an area in which the battery cells 102 are not directly contacting the thermal interface layer 110.

Heat transfer relating to cooling of the battery cells 102 may be less efficient where gaps are present between the mating surfaces of the thermal plate 108 and bottom surfaces of the battery cells 102. The thermal interface layer 110 is intended to assist in filling the gaps, however in this example the thermal interface layer 110 is not able to compensate for certain contact deficiencies. Eliminating these contact deficiencies and/or obtaining a flush contact between the surfaces of the battery cells 102 and thermal plate 108 may be desirable to provide for more enhanced heat transfer within the thermal management system. Additionally, difficulties may arise in applying the thermal interface layer 110 uniformly which may also contribute to battery cell 102 misalignments.

Figure 3A:
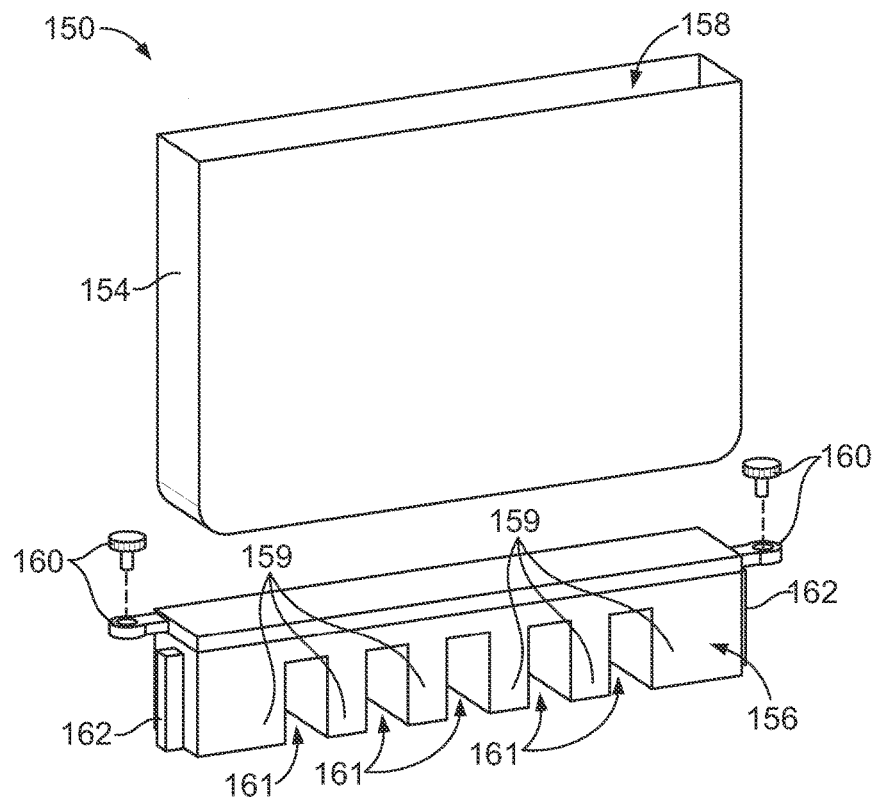
FIG. 3A is a perspective view of an example of a battery cell support assembly.
Figure 3B:
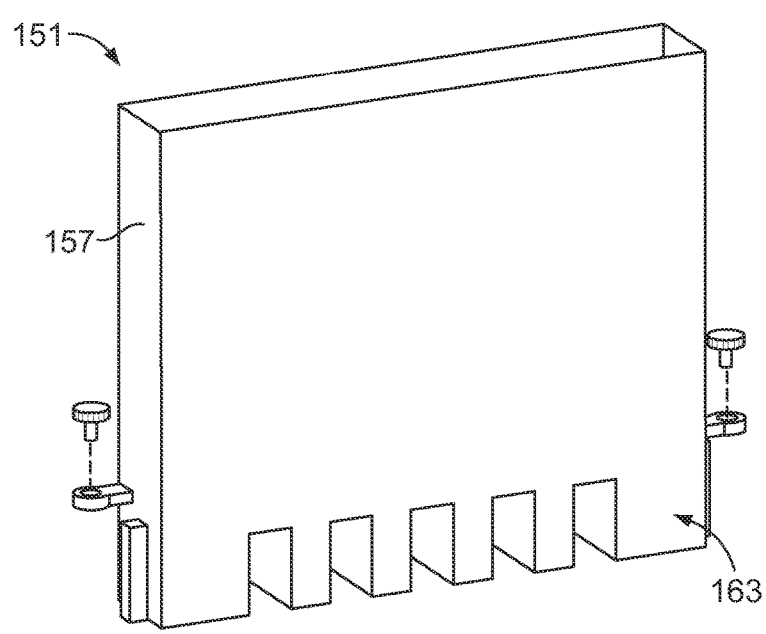
FIG. 3B is a perspective view of another example of a battery cell support assembly.

FIGS. 3A and 3B show two examples of an assembly to support a battery cell. The battery cell support assembly in FIG. 3A is referred to generally as a battery cell support assembly 150. The battery cell support assembly in FIG. 3B is referred to generally as a battery cell support assembly 151. The battery cell support assembly 150 may include a can case 154 and a base, such as a thermal base 156. The can case 154 may define a cavity 158 therein and sized to receive a battery cell, such as a prismatic battery cell. The thermal base 156 may be referred to as a thermal base and may define a multi-prong comb-shaped base. For example, the thermal base 156 may define one or more fins, such as segments 159 extending therefrom. The segments 159 may define a region 161 therebetween. When one or more battery cell support assemblies 150 are aligned with one another, the segments 159 may be aligned such that the regions 161 define channels. The channels may assist in providing a path for coolant to flow therethrough and as further described below. Various options may be available to secure the can case 154 and the thermal base 156 to one another. For example, the can case 154 and thermal base 156 may be joined to one another by brazing or a sinter bond. Alternatively or optionally the can case 154 and the thermal base 156 may be formed as a single component using mold process or 3D printing processes. The battery cell support assembly 151 is one example of a configuration in which a can case 157 and a thermal base 163 are a single component.

The thermal base 156 may include one or more locating features to assist in securing the battery cell support assembly 150 to a support structure such as a battery tray. For example, first locating features 160 and second locating features 162 may be defined by the thermal base 156. The first locating features 160 may include one or more mechanical fasteners to utilize a screw, bolt, or other similar fastener. The second locating features 162 may be shaped as columns defined by the thermal base 156. The columns may be sized for insertion within channels defined by the support structure. The locating features may also assist in aligning terminals of the battery cells for both series and parallel arrangements.

Figure 4A:
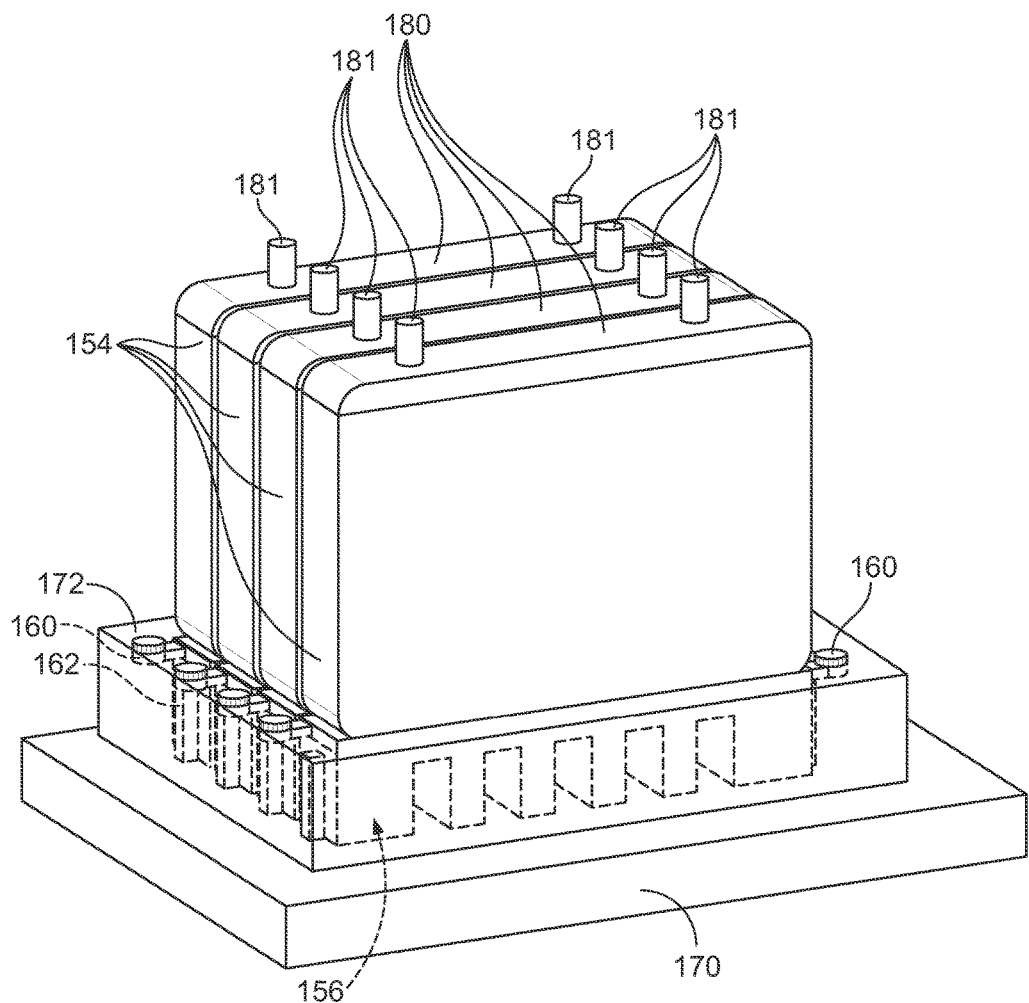
FIG. 4A is a perspective view of the batter cell support assembly of FIG. 3 and an example of a support structure.
Figure 4B:
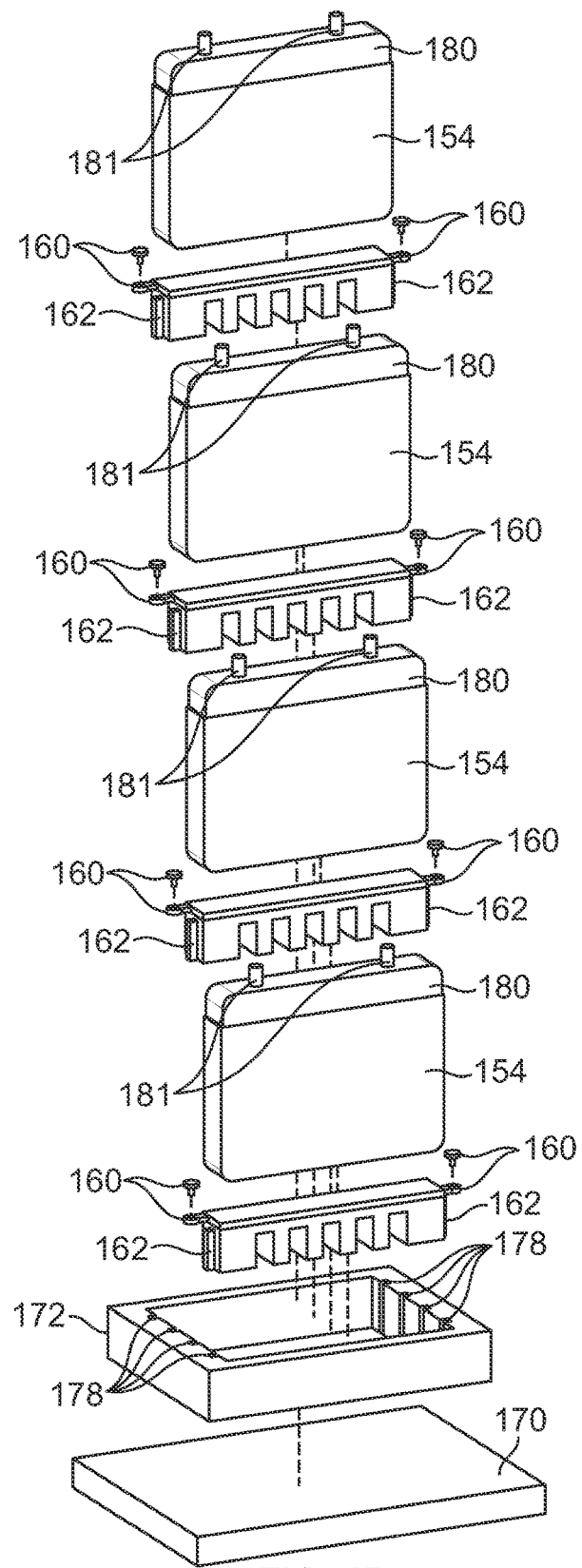
FIG. 4B is an exploded view of FIG. 4A.

FIGS. 4A through 4D show an example of a support structure which includes a battery tray 170 and a retainer 172. The retainer 172 may be mounted to the battery tray 170 or the retainer 172 and the battery tray 170 may be a single component. The retainer 172 may be sized to receive one or more battery cell support assemblies 150. For example, FIG. 4A shows four battery cell support assemblies 150 disposed within the retainer 172. While FIGS. 4A and 4B show four battery cell support assemblies 150, it is contemplated that the support structure may be configured to support any suitable number of battery cell support assemblies 150 to address, for example, power and performance requirements. For example, an EV vehicle may use 600 battery cells while an HEV may use 300 battery cells. The retainer 172 may include one or more channels 178 sized to receive one of the respective second locating features 162. The retainer 172 may include one or more receiving bores sized to receive one of the respective first locating features 160.

A battery cell 180 may be disposed within each of the can cases 154. Terminals 181 may extend from the battery cell 180. A plurality of battery cells 180 may be aligned to form an array and may be electrically connected to one another and provide power for a vehicle to draw upon. The thermal base 156 may operate as a heat sink to assist in managing thermal conditions of the battery cell 180 housed within the can case 154.

Figure 4C:
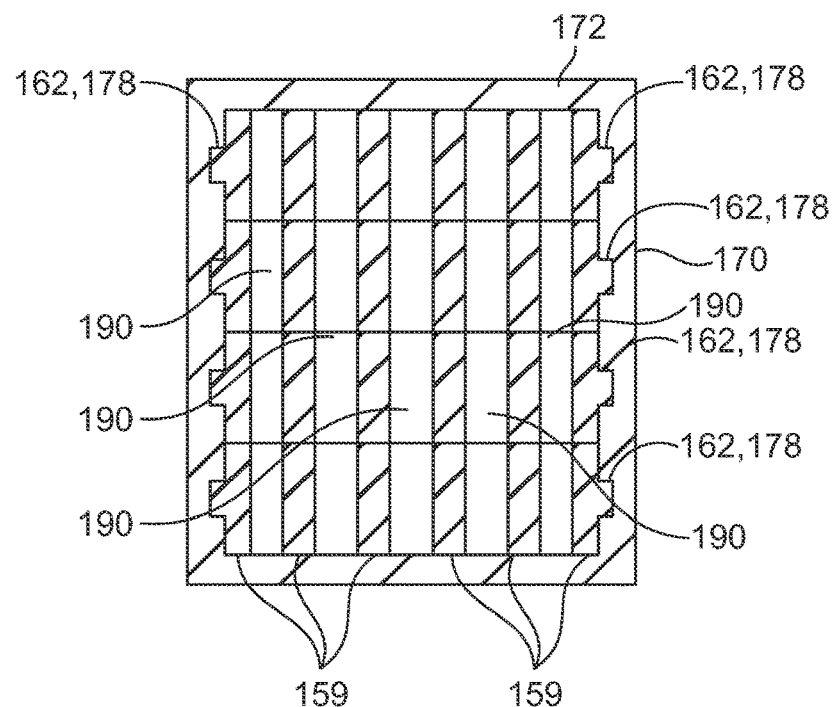
FIG. 4C is a plan view, in cross-section, of a portion of FIG. 4A.
Figure 4D:
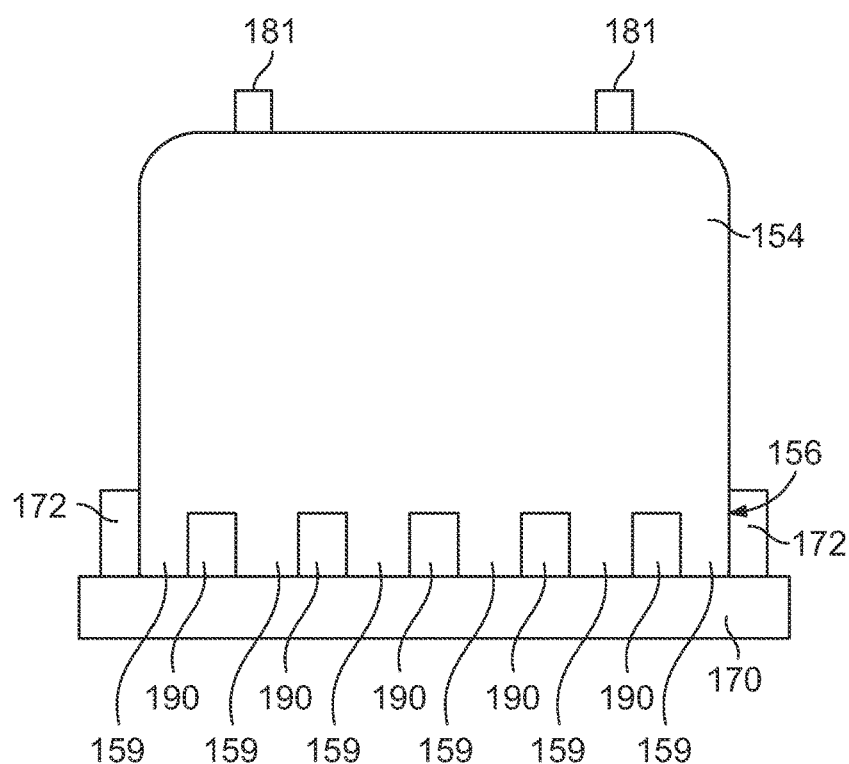
FIG. 4D is a front view, in cross-section, of a portion of FIG. 4A.

For example, the battery tray 170 may be arranged with the thermal bases 156 to define coolant channels 190 in between the segments 159. The coolant channels 190 may direct coolant flow in a direction parallel with a longitudinal axis defined by an array of the battery cells 180. FIGS. 4C and 4D are cross-sectional views showing an example of a set of the coolant channels 190. The coolant channels 190 may be defined by the thermal bases 156 and the battery tray 170. Coolant may flow through the coolant channels 190 to assist in managing thermal conditions of the battery cells 180 disposed within respective cavities 158. An exchange of heat may occur between coolant and the battery cells 180 via the battery support assembly 150. In this example, the battery cell support assembly 150 and the support structure do not include a thermal interface layer as shown in FIG. 2. An absence of the thermal interface layer as shown in FIG. 2 may reduce thermal resistance and enhance thermal exchange between the battery cells 180 and coolant within the coolant channels 190. An inlet and an outlet (not shown) may each open to the coolant channels 190 or a plenum (not shown) to assist in delivering and removing coolant. For example, the retainer 172 may define the inlet, outlet, and one or more plenums open to the coolant channels 190.

The battery cell support assemblies 150 and support structure may be sized to facilitate a modular relationship between one another. For example, a location of each battery cell support assembly 150 may be interchangeable between locations of the other of the battery cell support assemblies 150. This modular relationship may assist in simplifying installation of the battery cell support assemblies 150 to the support structure and may also reduce errors in the same. The modular relationship may further provide advantages to repair scenarios in that battery cells 180 which fail may be swapped out without having to replace the respective battery support assembly 150. Further, a total number of parts required to support and cool battery cells may be reduced.

The channels 178 and second locating features 162 may be sized relative to one another to seal contents of the coolant channels 190 therein. A seal, such as a gasket, may also assist in sealing contents of the coolant channels 190 therein. The seal may be located, for example, adjacent the battery cells 180 and mounted to the retainer 172. The retainer may define a groove or lip (not shown) to receive all or a portion of the seal. Dielectric materials may be used in the battery support assembly 150, such as the thermal base 156, to address potential isolation issues resulting from electrically charged portions of the battery support assembly 150 which may arise with a metallic can case 154. Examples of suitable dielectric materials include, but are not limited to aluminum nitride, aluminum oxide, and silicon nitride.

Figure 5A:
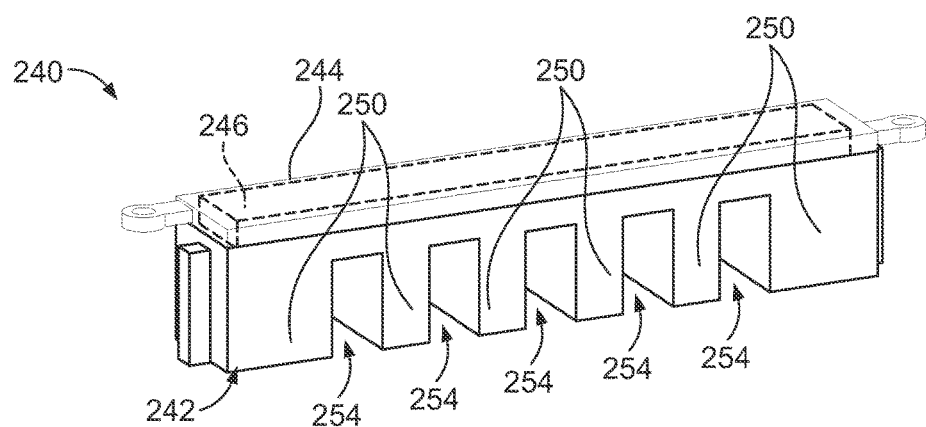
FIG. 5A is a perspective view of an example of a thermal base for a battery cell support assembly.

FIG. 5A shows an example of a configuration for a thermal base assembly. In this example, a thermal base assembly 240 may include a thermal base 242 and an interface layer 244. The interface layer 244 may be mounted to the thermal base 242. The interface layer 244 may include a dielectric material 246 embedded therein. Examples of suitable materials for the dielectric material 246 include, but are not limited to, aluminum nitride, aluminum oxide, and silicon nitride. The thermal base 242 may define a multi-prong comb-shaped base. For example, the thermal base 242 may define one or more fins, such as segments 250 extending therefrom. The segments 250 may define a region 254 therebetween. When one or more thermal base assemblies 240 are aligned with one another, the segments 250 may align such that the regions 254 define channels for coolant to flow therethrough when the one or more thermal base assemblies 240 are mounted to a support structure. As described above, various options may be available to secure a can case for a battery cell and the thermal base 242 to one another. For example, a can case and the thermal base 242 may be joined to one another by brazing or a sinter bond. Alternatively or optionally, a can case and the thermal base 242 may be formed as a single component. In this example, the dielectric material 246 may electrically isolate a mounted can case from the thermal base 242.

Figure 5B:
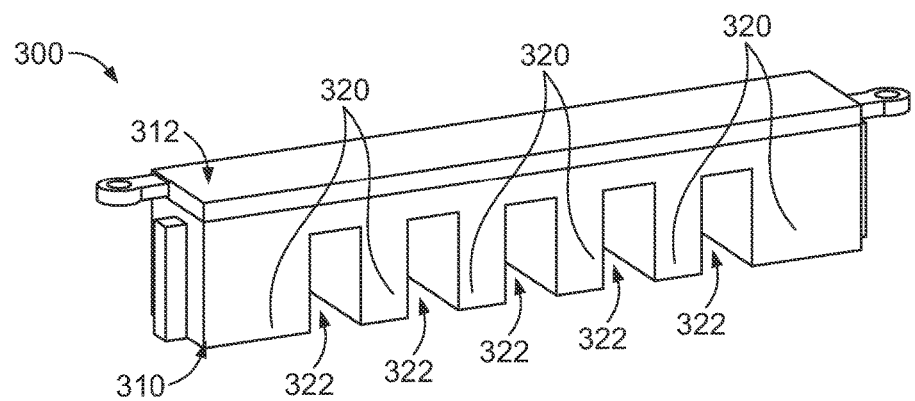
FIG. 5B is a perspective view of another example of a thermal base for a battery cell support assembly.

FIG. 5B shows another example of a configuration for a thermal base assembly. In this example, a thermal base assembly 300 may include a thermal base 310 and an interface layer 312. The interface layer 312 may be mounted to the thermal base 310. The interface layer 312 may be a metal bond interface layer. Examples of suitable materials for the interface layer 312 include, but are not limited to, aluminum and steel. The interface layer 312 may be of a same material as a can case associated therewith. The thermal base 310 may define a multi-prong comb-shaped base. For example, the thermal base 310 may define one or more fins, such as segments 320 extending therefrom. The segments 320 may define a region 322 therebetween. When one or more thermal base assemblies 300 are aligned with one another, the segments 320 may align such that the regions 322 define channels for coolant to flow therethrough when the one or more thermal base assemblies 300 are mounted to a support structure. It is contemplated that a thermal base may be made up of one metallic material, such as aluminum. As described above, various options may be available to secure a can case for a battery cell and the thermal base 310 to one another. For example, a can case and the thermal base 310 may be joined to one another by brazing or a sinter bond. Alternatively or optionally, a can case and the thermal base 310 may be formed as a single component. In this example, the thermal base 310 may be of a dielectric material and may electrically isolate a mounted can case from the thermal base 310.

Embodiments of a thermal base assembly as described above may assist in managing temperatures of a traction battery by reducing battery cell to heat sink thermal resistance as direct contact between battery cells and a thermal management system improves. This improved contact may enhance a thermal exchange for battery cell cooling (charge and discharge) and heating (cold start). Various configurations of a thermal base or thermal battery support assembly as described above provide design options based on a can case charge, e.g. can case neutral or can case positive, to assist in electrically isolating a battery cell from an electrically conductive medium such as the coolant or a housing of the battery pack. The various configurations of a thermal base or thermal battery support assembly as described above may provide multiple fabrication options such as direct bonding or 3D printing. A battery cell may be obtained from a third party and implemented with a thermal management system which includes a thermal base or thermal battery support assembly as described above. This implementation may provide options for streamlined thermal, electrical, and mechanical features across various traction battery designs. An assembly process of traction batteries may be improved using the thermal base or thermal battery support assembly described above. For example, locating features may assist in improving consistent assembly and modular characteristics may assist in reducing assembly error.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:
1. A vehicle traction battery assembly comprising:
an array of stacked cases each defining a battery cell cavity;
an array of stacked bases each including a first locating feature and prongs forming a comb shape; and
a support structure including a tray having second locating features each sized to integrate with one of the first locating features,
wherein the support structure and the bases define coolant channels extending a stacked case length between the prongs.
2. The assembly of claim 1, wherein a lower portion of each of the cases open to the channels is of a dielectric material.
3. The assembly of claim 1, further comprising a dielectric layer spanning a length of the cases and located above the channels.
4. The assembly of claim 1, wherein each of the cases defines a third locating feature sized to integrate with a fourth locating feature of an adjacent case to align the cases.
5. The assembly of claim 1, further comprising a gasket to seal the channels.
6. The assembly of claim 1, wherein the assembly lacks a thermal interface material.
7. A vehicle traction battery assembly comprising:
a plurality of housings each defining a cavity sized to receive a prismatic battery cell;
a plurality of thermal bases each defining a width equal to a width of one of the housings, one or more fins spaced apart from one another along a length of a respective thermal base, and a locating feature extending vertically along a side; and a retainer defining a base cavity to receive the thermal bases and defining receiving channels about a base cavity perimeter each to receive one of the locating features, wherein the fins of each thermal base are oriented to align with fins of another thermal base to define coolant channels between the fins extending a length of the thermal bases when the thermal bases are stacked in an array.

8. The assembly of claim 7, wherein the thermal base further defines a mechanical fastener to secure the retainer thereto and such that the fins of the thermal bases are aligned with one another when the thermal bases are stacked in an array.

9. The assembly of claim 8, further comprising a gasket secured between the retainer and a perimeter of the stacked thermal bases such that coolant is contained within the channels.

10. The assembly of claim 7, wherein each of the thermal bases includes a dielectric layer located below a metal bond interface layer joined with a respective housing.

11. The assembly of claim 7, wherein the fins of each thermal base are of a dielectric material and an upper portion of each thermal base defines a metal bond interface.

12. The assembly of claim 7, wherein each of the thermal bases defines a metal bond interface.

13. A modular vehicle traction battery assembly comprising:
a plurality of prismatic battery cells;
a plurality of thermal bases each defining a cavity sized to receive one of the battery cells and a locating feature, and each of the plurality of thermal bases including a plurality of fins extending from a lower portion;
a retainer including a cavity sized to receive the plurality of thermal bases and including receiving channels each sized to receive one of the locating features; and
a tray arranged with the thermal bases to define coolant channels extending a length of the plurality of thermal bases and between the fins when the thermal bases are aligned,
wherein each of the locating features is sized to mate with any one of the receiving channels to mount a respective thermal base within the retainer.

14. The assembly of claim 13, wherein each of the thermal bases includes a dielectric layer located between the cavity and coolant channels.

15. The assembly of claim 13, wherein a lower portion of each of the thermal bases open to the channels is of a dielectric material.

16. The assembly of claim 13, wherein a lower portion of each of the thermal bases defines a metal bond interface.

17. The assembly of claim 13, further comprising a gasket secured between the prismatic battery cells and the tray such that coolant is contained within the channels.

18. The assembly of claim 13, wherein the assembly lacks a thermal interface material.

* * * * *